United States Patent Office 3,677,772
Patented July 18, 1972

3,677,772
CYCLOALKYL MERCAPTAN COMPOSITIONS AND PROCESSES THEREFOR
Cynthia Mussinan, Bricktown, Christopher Giacino, Califon, and Ira Katz, Elberon, N.J., assignors to International Flavors & Fragrances Inc., New York, N.Y.
No Drawing. Filed May 14, 1970, Ser. No. 37,305
Int. Cl. A23l 1/26
U.S. Cl. 99—140 R          22 Claims

ABSTRACT OF THE DISCLOSURE

Foodstuff, flavor augmenting and flavor imparting compositions containing a quantity of cycloalkyl mercaptan sufficient to alter the organoleptic characteristics of said composition.

---

The present invention relates in general to compositions useful in altering the organoleptic characteristics of a foodstuff. More particularly, this invention has to do with the use of cycloalkyl mercaptans to alter the flavor of foodstuffs.

The term "alter" in its various forms is used herein to mean the supplying or imparting a flavor character or note to an otherwise bland, relatively tasteless substance, or augmenting an existing flavor characteristic where the natural flavor is deficient in some regard, or supplementing the existing flavor impression to modify its quality, character or taste.

The term "foodstuff" as used herein includes both solid and liquid ingestible materials which usually do, but need not, have nutritional value. Thus, foodstuffs includes meats, gravies, soups, convenience foods, beverages, dairy products, candies, vegetables, cereals, soft drinks, snacks and the like.

Reproduction of roasted and meat flavors and aroma has been the subject of a long and continuing search by those engaged in the production of foodstuff. The acute shortage of foods, especially protein foods, in many parts of the world has given rise to the need for utilizing nonmeat sources of proteins and making such proteins as palatable and as meat-like as possible. Hence, materials which are capable of closely simulating or even exactly reproducing the flavor and aroma of roasted products and meat products are highly desirable, if not necessary.

In accordance with this invention, it has been found that novel foodstuff and flavoring compositions having desirable meat, roasted meat, etc., fragrance and flavor notes may be readily provided by the utilization of at least one compound comprising a cycloalkyl mercaptan containing from 4 to 9 intracyclic carbon atoms. The term cycloalkyl as used herein is intended to encompass both substituted and unsubstituted homocyclic ring structures. Thus, such compounds may contain one or more nuclear substitutents, the salient requirement being that any such substituent be devoid of any tendency to deleteriously affect the functionality of the parent compound having reference to the ultimate environment contemplated, i.e., a foodstuff or flavoring composition. Thus, inert substituents of an innocuous nature such as lower alkyl containing from 1 to 6 and preferably 1 to 3 carbon atoms may be present.

Thus, the cycloalkyl mercaptan compounds contemplated for the use in the practice of the present invention can also, for convenience, be represented according to the following structural formula:

wherein R represents hydrogen or lower alkyl of 1 to 6 carbon atoms and $R_1$ represents the carbon atoms necessary to complete a cycloalkyl group, containing from 4 to 9 intracyclic carbon atoms.

As previously indicated, the cycloalkyl moiety defined by $R_1$ in the foregoing structural formula may be further substituted to provide, for example, a partially or completely alkylated homocyclic ring system. Thus, the compounds contemplated for use in the present invention can also, for convenience, be represented according to the following structural formula:

wherein R has the aforedescribed significance, $R_2$ and $R_3$ are independently selected from hydrogen and lower alkyl of 1 to 6 and preferably, 1 to 3 carbon atoms, and $n$ represents an integer of from 3 to 8 inclusive.

Specific representatives of compounds included within the foregoing structural formulae are:

cyclobutyl mercaptan
cycloheptyl mercaptan
cyclooctyl mercaptan
3,3,4,4-tetramethyl-5,5-diethyl-cycloheptyl mercaptan
1,2,3,3,4,4,5,5-octamethyl cyclopentyl mercaptan
3-ethyl-4-methyl-cyclohexyl mercaptan
3,4,5-trimethyl cyclohexyl mercaptan
5-n-butyl-cyclooctyl mercaptan
3,4-diethyl-cyclohexyl mercaptan
cyclopentyl mercaptan
cyclohexyl mercaptan
cyclononyl mercaptan
2,3-diethyl-cyclohexyl mercaptan
2-4-di-n-propyl-cyclo-heptyl mercaptan
2-methyl-cyclopentyl mercaptan
5-methyl-cyclooctyl mercaptan The mercaptan compounds described herein may be employed either singly or in admixtures comprising two or more thereof; such a mode of proceeding offers the advantage that the beneficial aspects characterizing each of a plurality of such mercaptan compounds may be exploited in a specific instance. In this manner, the formulator is afforded effective means to simulate a wide variety of organoleptic factors whereby to evoke a predetermined taste response on the part of the consumer. Thus, such compounds are capable of providing a meat-like flavor, e.g., roasted meat, having a slight oniony or garlic character with fatty green notes, and accordingly may be utilized in combination with other edible materials to impart a meaty or roasted meat organoleptic impression to foods or other edible materials ranging from beef through poultry, e.g., chicken, turkey and the like. In addition, the cycloalkyl mercaptan compounds can be used to provide distinctive aromas in perfume materials to be used with food-related or non-food products. Furthermore, the cycloalkyl mercaptan compounds may be used to provide desired food-like, freshly-baked aromas to food products when they are cooked, roasted, baked or otherwise heated or prepared for consumption. Accordingly, the cycloalkyl mercaptan may be added to compositions adapted to provide a fresh bread-like aroma during baking.

Sulfide derivatives suitable for use in the afore-described manner are represented by the following structural formula:

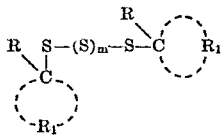

wherein R and $R_1$ have the aforedescribed significance and *m* is one or two.

The formation of the cycloalkyl mercaptan in situ with the remaining ingredients of the flavoring or foodstuff composition can likewise be carried out by employing as the precursor, a mercaptal and/or hemimercaptal capable of yielding the desired cycloalkyl mercaptan by simple hydrolysis e.g., at refluxing temperatures. Particularly suitable for such use is the mercaptal formed on the addition of acetaldehyde to cyclopentyl mercaptan, such mercaptal having the following structural formula:

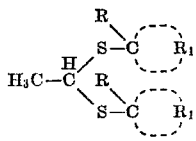

wherein R and $R_1$ have the aforedescribed significance. Complete conversion of the mercaptal to the corresponding mercaptan is not required since the mercaptal precursor is likewise capable of providing beneficial flavoring effects.

The cycloalkyl mercaptan flavoring agents described herein may also be prepared in known manner by, for example, reacting the desired cycloalkene with sulfur, hydrogen and molybdenum disulfide or alternatively, by reacting the desired cycloalkyl chloride or bromide with $H_2S$ and purifying the reaction product by extraction and/or distillation.

The nature of the co-ingredients included with the cycloalkyl mercaptan in formulating the product composition will, of course, depend primarily upon the ultimate use contemplated, i.e., as a foodstuff per se or alternatively as a flavoring composition adapted to be added to a foodstuff at some subsequent point of time. In any event, such compounds serve to alter the organoleptic characteristics of the ultimate foodstuff treated therewith. Preferred compositions are those formulated with a protein hydrolysate, thiamine, sodium glutamate, 5'-ribonucleotides and amino acids such as cysteine, glutamic acid, polypeptides and the like.

Substances suitable for use herein as co-ingredients or flavoring adjuvants are well known in the art for such use being extensively described in the relevant literature. Apart from the requirement that any such material be "ingestibly" acceptable, and thus non-toxic or otherwise non-deleterious, nothing particularly critical resides in the selection thereof. Accordingly, such materials, which may in general be characterized as flavoring adjuvants or vehicles comprise broadly, stabilizers, thickeners, surface active agents, conditioners, flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6 - di - tertiary - butyl - 4 - methyl phenol) propyl gallate and the like, sequestrants, e.g., citric acid.

Thickener compounds include carriers, binders, protective colloids, suspending agents, emulsifiers and the like, e.g., agar-agar; carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches; pectins, and emulsifiers, e.g., mono- and diglycerides of fatty acids.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, tumeric and curcunin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferric pyrophosphate, ferrous gluconate and the like, riboflavin, vitamins, zinc sources such as zinc chloride, zinc sulfate and the like.

Flavorants and flavor intensifiers include organic acids, e.g., fatty saturated, unsaturated and amino acids; alcohols, e.g., primary and secondary alcohols; esters; carbonyl compounds including aldehydes and ketones, lactones; cyclic organic materials including benzene derivatives; alicyclics, heterocyclics such as furans, particularly 2-acetylfuran, pyridines, pyrazines and the like, sulfur-containing materials including thiazoles, thiols, sulfides, disulfides and the like; so-called flavor potentiators such as monosodium glutamate, guanylates, inosinates, natural and synthetic flavorants such as vanillin, natural gums and the like; spices, herbs, essential oils and extractives including anise, anise oil, alkanet root extract, bay leaves, capsicum extract and the like.

The specific flavoring adjuvant selected for use may be either solid or liquid, depending upon the desired physical form of the ultimate product, i.e., foodstuff, whether simulated or natural, and should, in any event, be capable of providing an environment in which the cycloalkyl mercaptan can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuff to which the flavor and aroma are to be imparted. In contra-distinction, in the preparation of solid products, e.g., simulated foodstuffs, ingredients capable of providing normally solid compositions should be selected such as various cellulose derivatives.

As will be appreciated by those skilled in the art, the amount of cycloalkyl mercaptan employed in a particular instance can vary over a relatively wide range whereby to achieve desired organoleptic effects having reference to the nature of the product. Thus, correspondingly greater amounts would be necessary in those instances wherein the ultimate food composition to be flavored is relatively bland to the taste, whereas relatively minor quantities may suffice for purposes of enhancing a composition merely deficient in natural flavor or aroma. Thus, the primary requirement is that the amount selected be effective, i.e., sufficient to alter the organoleptic characteristics of the parent composition, whether foodstuff per se or flavoring composition. Thus, the use of insufficient quantities of the cycloalkyl mercaptan will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, it is found that effective quantities of cycloalkyl mercaptan range from about 1.0 part per billion to about 500 parts per million by weight based on total composition. Concentrations in excess of the maximum quantities stated are not normally recommended since they fail to provide commensurate enhancement of organoleptic properties. In those instances wherein the cycloalkyl mercaptan is added to the foodstuff as an integral component of a flavoring composition, it is, of course, essential that the total quantity of flavoring composition employed be sufficient to yield an effective mercaptan concentration in the foodstuff product.

Flavoring compositions prepared in accordance with the present invention preferably contain the cycloalkyl mercaptan in concentrations ranging from about 0.001% to about 10% by weight, based on the total weight of said flavoring composition.

It will be understood of course in those instances wherein the precursor form of the cycloalkyl mercaptan is employed, sufficient quantities thereof will be added to provide an ultimate cycloalkyl mercaptan concentration falling within the aforestated ranges. All parts, proportions, percentages and ratios herein are by weight unless otherwise indicated.

The compositions described herein can be prepared according to conventional techniques well known in the art for such purposes. Thus, liquid products can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the cycloalkyl mercaptan compound with, for example, gum arabic, gum tragacanth, carrageenan and the like, and thereafter, spray-drying the resultant mixture whereby to obtain the particulate solid product. Pre-prepared flavor mixes in powder form may be obtained by mixing the dried solid components and cycloalkyl mercaptan in a dry blender until the requisite degree of uniformity is achieved.

The following examples are given for purposes of illustration only and are not to be considered as necessarily constituting a limitation on the present invention.

EXAMPLE I

The following are homogeneously admixed at 25° C.:

| Ingredients: | Parts |
|---|---|
| Vegetable shortening | 622.7 |
| Salt | 321.7 |
| Glutamic acid | 5.1 |
| L-cysteine hydrochloride | 10.3 |
| Glycine | 5.1 |
| β-Alanine | 1.3 |
| Taurine | 20.0 |
| Mixture of di-sodium inosinate and di-sodium guanylate | 3.3 |
| Cyclopentyl mecraptan | 0.10 |

This mixture is heated to 300° F. for thirty seconds. After cooling to 100° F., 0.12 part of diacetyl and 0.10 part of hexanal are added. The resulting mixture has an excellent chicken aroma.

EXAMPLE II

The following materials are homogeneously mixed at 25° C.:

| Ingredients: | Parts |
|---|---|
| Vegetable shortening | 622.7 |
| Salt | 321.7 |
| Glutamic acid | 5.1 |
| L-cysteine hydrochloride | 10.3 |
| Glycine | 5.1 |
| β-Alanine | 1.3 |
| Taurine | 20.0 |
| Mixture of di-sodium inosinate and di-sodium guanylate | 3.3 |

The mixture is heated at 300° F. for thirty seconds. After cooling to 100° F., 0.12 part of diacetyl and 0.10 part of hexanal are added. After aging the resulting mixture for three hours, 0.1 part of 3-methyl cyclohexyl mercaptan is added.

Tre resulting mixture is aged for ten hours to provide a material having an excellent chicken aroma.

EXAMPLE III

| Ingredients: | Parts |
|---|---|
| Vegetable shortening | 622.7 |
| Salt | 321.7 |
| Glutamic acid | 5.1 |
| L-cysteine hydrochloride | 10.3 |
| β-Alanine | 1.3 |
| Taurine | 20.0 |
| Mixture of di-sodium inosinate and di-sodium guanylate | 3.3 |
| 2-ethyl-3-methyl-cyclopentyl mercaptan | 0.1 |

This mixture is heated to 300° F. for thirty seconds. After cooling to 100° F., 0.12 part of diacetyl and 0.10 part of hexanal are added.

The resulting mixture has an excellent chicken aroma.

EXAMPLE IV

The following ingredients are homogeneously mixed at 25° C.:

| Ingredients: | Parts |
|---|---|
| Vegetable shortening | 622.7 |
| Salt | 321.7 |
| Glutamic acid | 5.1 |
| L-cysteine hydrochloride | 10.3 |
| Glycine | 5.1 |
| β-Alanine | 1.3 |
| Taurine | 20.0 |
| Mixture of di-sodium inosinate and di-sodium guanylate | 3.3 |

The mixture is heated to 300° F. for thirty seconds. After cooling to 100° F., 0.12 part of diacetyl, 0.10 part of hexanal, and 0.1 part of cyclopentyl mercaptan are added.

The resulting mixture has an excellent chicken aroma.

EXAMPLE V

The following ingredients are homogeneously mixed at 25° C.:

| Ingredients: | Parts |
|---|---|
| Vegetable shortening | 622.7 |
| Salt | 321.7 |
| Glutamic acid | 5.1 |
| L-cysteine hydrochloride | 10.3 |
| Glycine | 5.1 |
| β-Alanine | 1.3 |
| Taurine | 20.0 |
| Mixture of di-sodium inosinate and di-sodium guanylate | 2.0 |

The mixture is heated to 300° F. for sixty seconds. After cooling to 100° F., 0.12 part of diacetyl and 0.10 part of hexanal are added. After aging the mixture for a period of three hours at a temperature of 65° F., 0.1 part of 2-propylcycloheptyl mercaptan are added. The resulting mixture is then aged for ten hours to yield a composition having an excellent chicken aroma and flavor.

EXAMPLE VI

Cysteine hydrochloride in the amount of 8.8 g. is refluxed at 215° F. under atmospheric pressure for four hours with a mixture of 309 g. of hydrolyzed vegetable protein and 674 g. of water. Subsequent to the reflux, the mixture is cooled and 0.05 g. of 3-ethyl-cyclooctyl mercaptan is added and intimately admixed with the composition. The mixture has an excellent beef flavor.

EXAMPLE VII

The mercaptal of acetaldehyde and cyclopentyl mercaptan in the amount of 0.05 g. is refluxed at 215° F. under atmospheric pressure for four hours with the following permix composition:

| Ingredients: | Amount, g. |
|---|---|
| Hydrolyzed vegetable protein (Maggi 4BE) | 309 |
| Water | 674 |
| Thiamine-HCl | 8.8 |
| Cysteine-HCl | 8.8 |

Subsequent to the reflux period, the resulting mixture is aged for 72 hours at 60–75° C. The mixture has an excellent beef aroma.

EXAMPLE VIII

Cycloheptyl mercaptan in the amount of 0.05 g. is refluxed at 215° F. under atmospheric pressure for four hours with the following pre-mix composition:

| Ingredients: | Amount, g. |
|---|---|
| Hydrolyzed vegetable protein (Maggi 4BE) | 309 |
| Cysteine-HCl | 8.8 |
| Thiamine-HCl | 8.8 |
| Water | 674 |

Subsequent to the reflux, the resulting mixture is aged for 72 hours at 60–75° C. The mixture has an excellent beef aroma.

EXAMPLE IX

The composition prepared in Example I is dissolved in propylene glycol to provide a 0.1% solution. This solution in the amount of 0.966 g. is added to 7.3 g. of a soup base consisting of:

| Ingredients: | Parts |
|---|---|
| Fine ground sodium chloride | 35.62 |
| Hydrolyzed vegetable protein | 27.40 |
| Monosodium glutamate | 17.81 |
| Sucrose | 10.96 |
| Beef fat | 5.48 |
| Sethness caramel color (powder B&C) | 2.73 |

The resulting mixture is added to 12 ounces of boiling water to obtain a soup having an excellent chicken flavor.

The composition of Example VII (0.005 g.) when added to the above soup base also provides a soup having good meat flavor.

EXAMPLE X

The composition prepared in Example VI is dissolved in propylene glycol to provide a 0.1% solution. This solution in the amount of 0.966 g. is added to 7.3 g. of a soup base consisting of:

| Ingredients: | Parts |
|---|---|
| Fine ground sodium chloride | 35.62 |
| Hydrolyzed vegetable protein (Maggi 4BE) | 27.40 |
| Monosodium glutamate | 17.81 |
| Sucrose | 10.96 |
| Beef fat | 5.48 |
| Sethness caramel color (powder B&C) | 2.73 |

The resulting mixture is added to 12 ounces of boiling water to obtain a soup having an excellent chicken flavor.

The composition of Example III (0.005 g.) when added to the above soup base also provides a soup having good meat flavor.

EXAMPLE XI

One-half gram of the soup base mixture of Example IX is emulsified in a solution containing 100 g. gum arabic and 300 g. water. The emulsion is spray-dried with a Bowen Lab Model Drier utilizing 250 c.f.m. of air with an inlet temperature of 500° F., an outlet temperature of 200° F., and a wheel speed of 50,000 r.p.m.

Twelve grams of the spray-dried material is mixed with 29.2 g. of the soup base set forth in Example VII. The resulting mixture is then added to 12 ounces of boiling water, and an excellent meat flavored soup is obtained.

EXAMPLE XII

Example I is repeated except that the cyclopentyl mercaptan is replaced by .003 part of a mixture comprising the following ingredients:

| Ingredients: | Parts |
|---|---|
| Cycloheptyl mercaptan | 10 |
| Cyclopentyl mercaptan | 26 |
| Corn oil | 50 |
| Gum arabic | 20 |

The resulting mixture has an excellent meat flavor.

What is claimed is:

1. A flavor modifying composition comprising an ingestibly acceptable flavoring adjuvant and at least one cycloalkyl mercaptan, the cycloalkyl moiety containing from 4 to 9 intracyclic carbon atoms, said mercaptan being present in amounts sufficient to alter the flavor of a food stuff in which it is incorporated.

2. A composition according to claim 1, wherein said mercaptan has the formula:

wherein R represents hydrogen or lower alkyl containing from 1 to 6 carbon atoms, and $R_1$ represents the carbon atoms necessary to complete a cycloalkyl group containing from 4 to 9 intracyclic carbon atoms.

3. A composition according to claim 1, wherein said flavoring adjuvant comprises a thickener, stabilizer, surface active agent, conditioner, flavoring intensifier or flavorant.

4. A composition according to claim 3, wherein said mercaptan is present in amounts ranging from about .001 to 10% by weight of total composition.

5. A composition according to claim 1, wherein said flavoring adjuvant comprises diacetyl or hexanal.

6. A composition according to claim 5, wherein said mercaptan is present in amounts ranging from about 1.0 part per billion to 500 parts per million by weight of total composition.

7. A composition according to claim 1, wherein said mercaptan comprises cyclopentyl mercaptan.

8. A composition according to claim 1, wherein said mercaptan comprises 3-methyl-cyclohexyl mercaptan.

9. A composition according to claim 1, wherein said mercaptan comprises 2-ethyl-3-methyl-cyclopentyl mercaptan.

10. A composition according to claim 1, wherein said mercaptan comprises 2-propyl-cycloheptyl mercaptan.

11. A composition according to claim 1, wherein said mercaptan comprises 3-ethyl-cyclooctyl mercaptan.

12. A composition according to claim 1, wherein said mercaptan comprises cycloheptyl mercaptan.

13. A composition according to claim 1, wherein said mercaptan comprises a mixture of cyclopentyl mercaptan and cycloheptyl mercaptan.

14. A process for altering the flavor of a foodstuff which comprises incorporating in a foodstuff therein a small but effective amount of at least one cycloalkyl mercaptan, the cycloalkyl moiety containing from 4 to 9 intracyclic carbon atoms.

15. A process according to claim 14, wherein said mercaptan has the formula:

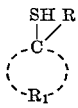

wherein R represents hydrogen or lower alkyl containing from 1 to 6 carbon atoms, and $R_1$ represents the carbon atoms necessary to complete a cycloalkyl group containing from 4 to 9 intarcyclic carbon atoms.

16. A process according to claim 14, wherein said mercaptan comprises cyclopentyl mercaptan.

17. A process according to claim 14, wherein said mercaptan comprises 3-methyl-cyclohexyl mercaptan.

18. A process according to claim 14, wherein said mercaptan comprises 2-ethyl-3-methyl cyclopentyl mercaptan.

19. A process according to claim 14, wherein said mercaptan comprises 2-propyl-cycloheptyl mercaptan.

20. A process according to claim 14, wherein said mercaptan comprises 3-ethyl-cyclooctyl mercaptan.

21. A process according to claim 14, wherein said mercaptan comprises cycloheptyl mercaptan.

22. A process according to claim 14, wherein said mercaptan comprises a mixture of cyclopentyl mercaptan and cycloheptyl mercaptan.

References Cited
UNITED STATES PATENTS 2,594,379   4/1952   Barch _____ 99—140

MORRIS O. WOLK, Primary Examiner

W. BOVEE, Assistant Examiner

U.S. Cl. X.R.

260—608, 609 D, 609 E